United States Patent [19]
Yamaki

[11] Patent Number: 6,148,345
[45] Date of Patent: Nov. 14, 2000

[54] POWER SAVINGS FOR SOUND SYSTEM

[75] Inventor: Kazunori Yamaki, Tokyo, Japan

[73] Assignee: Kabushiki Kaisha Toshiba, Kawasaki, Japan

[21] Appl. No.: 09/072,047

[22] Filed: May 5, 1998

[30] Foreign Application Priority Data

May 9, 1997 [JP] Japan .................................. 9-119693

[51] Int. Cl.[7] .............................................. G06F 15/16
[52] U.S. Cl. ...................... 709/253; 709/237; 709/219; 709/249; 709/243; 710/200; 710/129; 710/237; 714/47; 714/50; 713/340; 713/300; 713/324; 713/320; 712/29; 712/244; 712/245
[58] Field of Search ................................. 709/253, 237, 709/219, 225, 243, 249; 713/340, 300, 324, 320; 710/200, 129, 237; 714/47, 50; 712/29, 244, 245

[56] References Cited

U.S. PATENT DOCUMENTS

| | | |
|---|---|---|
| 4,918,650 | 4/1990 | Wolf . |
| 5,521,854 | 6/1996 | Kadowaki et al. ................. 713/321 |
| 5,530,879 | 6/1996 | Crump et al. ..................... 713/323 |
| 5,642,489 | 6/1997 | Bland et al. ...................... 710/128 |
| 5,737,616 | 4/1998 | Watanabe ......................... 713/340 |
| 5,768,601 | 6/1998 | Tran ................................. 713/300 |
| 5,794,057 | 8/1998 | Lada, Jr. .......................... 713/300 |
| 5,822,598 | 10/1998 | Lam ................................. 713/324 |
| 5,850,560 | 12/1998 | Kang ............................... 713/324 |
| 5,881,317 | 3/1999 | Hampsten et al. ................ 710/62 |
| 5,887,177 | 3/1999 | Heyl ................................ 713/300 |
| 5,910,930 | 6/1999 | Dieffenderfer et al. ........... 713/300 |
| 5,974,478 | 10/1999 | Wood et al. ...................... 710/22 |

FOREIGN PATENT DOCUMENTS

| | | |
|---|---|---|
| 7-239737 | 9/1995 | Japan . |
| 10-124201 | 5/1998 | Japan . |

*Primary Examiner*—Ayaz R. Sheikh
*Assistant Examiner*—Firmin Backer
*Attorney, Agent, or Firm*—Finnegan, Henderson, Farabow, Garrett & Dunner, L.L.P.

[57] ABSTRACT

A sound controller has a signal pin for externally outputting the contents of bit 1 of a control register for controlling its operation mode as a power down signal POWERDOWN# for controlling a power supply to analog audio amplifiers. The power down signal POWERDOWN# output from the signal pin is sent to a power supply controller. The power supply controller switches supply/stop of a power supply voltage VCC2 to the analog audio amplifiers in response to the signal POWERDOWN#. With this control, the power down control of the analog audio amplifiers can be realized in accordance with the state of the sound controller.

3 Claims, 10 Drawing Sheets

POWER SAVINGS FOR SOUND SYSTEM

BACKGROUND OF THE INVENTION

The entire contents of Japanese Patent Application No. 9-119693 filed on May 9, 1997 are incorporated herein by reference.

The present invention relates to a computer system and sound controller and, more particularly, to an improved computer system which can set analog audio circuits included as peripheral circuits of a sound controller in a power down mode in accordance with the state of the sound controller, a sound controller, and a power down control method applied thereto.

In recent years, various laptop or notebook type personal computers have been developed. Such personal computers have various power management functions to attain power savings. As typical power management functions, a suspend function of turning off the power supply for practically all the devices except for the main memory, a CPU sleep function of dropping the operation speed of the CPU in a system idle state, and the like are known.

Some peripheral devices used in a computer system can switch themselves from a normal mode to a power down mode requiring smaller consumption power than in the normal mode. The power down function of such device is normally used in combination with the above-mentioned CPU sleep function or the like. With these functions, the consumption power of the entire system can be reduced.

As a device with the power down function, "OPL3 Single-chip Audio System 3" available from YAMAHA CORPORATION is known. This sound controller is a sound controller chip having functions of FM sound source and CODEC, and is currently the standard sound source mounted on a personal computer.

The sound controller "OPL3" has a control register for switching its operation state between the normal and power down modes. When a sound driver program that controls "OPL3" sets a power down mode flag in the control register, "OPL3" is switched from the normal mode to the power down mode. In this power down mode, power supply to internal circuits for reproducing sound data is stopped, thus attaining power savings. When the sound driver program resets the power down mode flag in the control register, "OPL3" resumes the normal mode from the power down mode.

However, since the power down function of "OPL3" can only set that chip in the power down mode, even when the sound driver program sets the power down mode flag, analog audio circuits such as audio amplifiers serving as peripheral circuits of the sound chip are not set in the power down mode. For this reason, the analog audio circuits keep receiving operation power even during non-reproduction periods of sound data, thus wasting electric power.

The power down function of the sound controller preferably executes dynamic control not only in the system idle state but also in accordance with the presence/absence of sound data reproduction during system operation. However, in the conventional function, the sound driver program sets the power down mode flag in only the system idle state or suspend state, as described above, and cannot dynamically set the sound controller in the power down mode during system operation.

As described above, with the conventional function, only the sound controller itself is set in the power down mode, and power savings of peripheral analog audio circuits are not realized. The sound controller is set in the power down mode only in the system idle state or suspend state, but is kept in the normal mode even during non-reproduction periods of sound data.

BRIEF SUMMARY OF THE INVENTION

The present invention has been made in consideration of the above situation, and has as its object to provide a computer system which can set analog audio circuits serving as peripheral circuits of a sound controller in a power down mode in accordance with the state of the sound controller, and can efficiently realize power savings of both the sound controller and its peripheral analog audio circuits, a sound controller, and a power down control method applied thereto.

According to the present invention, in a system having analog audio circuits and a sound controller, the sound controller comprises a register for storing power down instruction information, a circuit for outputting a power down control signal for setting the analog audio circuits in a power down mode on the basis of the power down instruction information stored in the register, and a power supply circuit for ON/OFF-controlling a power supply to the analog audio circuits.

Also, according to the present invention, in a computer system which has a sound controller for controlling reproduction of sound data, analog audio circuits serving as peripheral circuits of the sound controller to input/output an analog audio signal, and a power supply circuit for supplying electric power to the analog audio circuits and sound controller, the sound controller comprises a register for storing power down instruction information, and a signal pin for externally outputting the power down instruction information written in the register as a power down signal for setting the analog audio signal in a power down mode, and the power supply circuit ON/OFF-controls a power supply to the analog audio circuits in accordance with the power down signal output from the signal pin.

In this computer system, the sound controller used as the sound source of that system has the signal pin for externally outputting the power down instruction information written in the register as a power down signal. The power down signal output from the signal pin is supplied to the power supply circuit. The power supply circuit ON/OFF-controls a power supply to the analog audio circuits including an audio amplifier, and the like in accordance with the power down signal.

Accordingly, when a sound controller having a power down function capable of automatic switching between a power down mode and normal mode in accordance with the power down instruction information is used, a power supply to the analog audio circuits can be ON/OFF-controlled in synchronism with switching of the operation state of the sound controller. Hence, power savings of both the sound controller and its peripheral analog audio circuits can be efficiently realized.

Even when the sound controller does not have any power down function, if the power supply circuit is designed to simultaneously switch supply/stop of electric power to both the sound controller and analog audio circuits, power savings of both the sound controller and its peripheral analog audio circuits can be realized.

Since the sound controller without any power down function normally has no dedicated register for storing power down instruction information, the power down instruction information is written in a versatile register in the sound controller, and a power down signal can be output from a signal pin connected to that versatile register.

When the sound controller comprises a 1-chip LSI including a digital circuit unit such as a bus interface and the like and an analog circuit portion for, e.g., sound data reproduction, the power down function is preferably realized by ON/OFF-controlling a power supply to the analog circuit portion so as to realize the power down function while assuring a read/write from the system to the register.

When the sound controller does not have any power down function, it preferably has a first power supply pin for receiving operation power of the digital circuit portion, and a second power supply pin for receiving operation power of the analog circuit portion, and the power supply circuit preferably ON/OFF-controls a power supply to both the second power supply pin of the sound controller and peripheral analog circuits. With this control, even in the sound controller without any power down function, power down control synchronous with the peripheral analog circuits can be realized while assuring operation of the digital circuit portion.

According to the present invention, a computer system having a register for storing power down information which has first status for instructing to set a power down mode and second status for instructing to release the power down mode, and a sound controller which serves as a sound source and the operation state of which is switched between the power down mode and a normal mode in accordance with the power down instruction information written in the register, comprises control means for controlling reproduction of sound data by the sound controller. The control means detects the start and end position of sound data to be transferred to the sound controller, writes the power down instruction information of the second status in the register prior to the beginning of transfer of the sound data, and writes the power down instruction information of the first status in the register at the end of transfer of the sound data.

In this computer system, by detecting the start and end positions of sound data using, e.g., a sound driver program, the power down instruction information of the second status is written in the register prior to the beginning of transfer of the sound data, and the power down instruction information of the first status is written in the register upon completion of transfer of the sound data. With this control, the operation state of the sound controller can be dynamically switched between the normal and power down modes in response to start/end of reproduction of sound data by the sound controller. Since the sound controller resumes the normal mode before transfer of the sound data actually starts, sound data can always be reproduced from its very beginning.

When the sound controller includes means for automatically detecting the start/end of transfer of sound data, power savings of the sound controller and its peripheral analog audio circuits can be realized without writing any power down instruction information in the register. As such automatic detection means, a hardware component that detects the start/end of DMA transfer can be used. In this case, the start of DMA transfer is preferably detected using generation of a DMA request signal from the sound controller to a DMA controller in the computer system or a write of a register value in a DMA controller in a shadow register allocated in the sound controller. With this control, before actual execution of DMA transfer, the sound controller can resume the normal mode, and data can always be reproduced from the first tone.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiments of the present invention will be described hereinafter with reference to the accompanying drawings.

Figure 1:
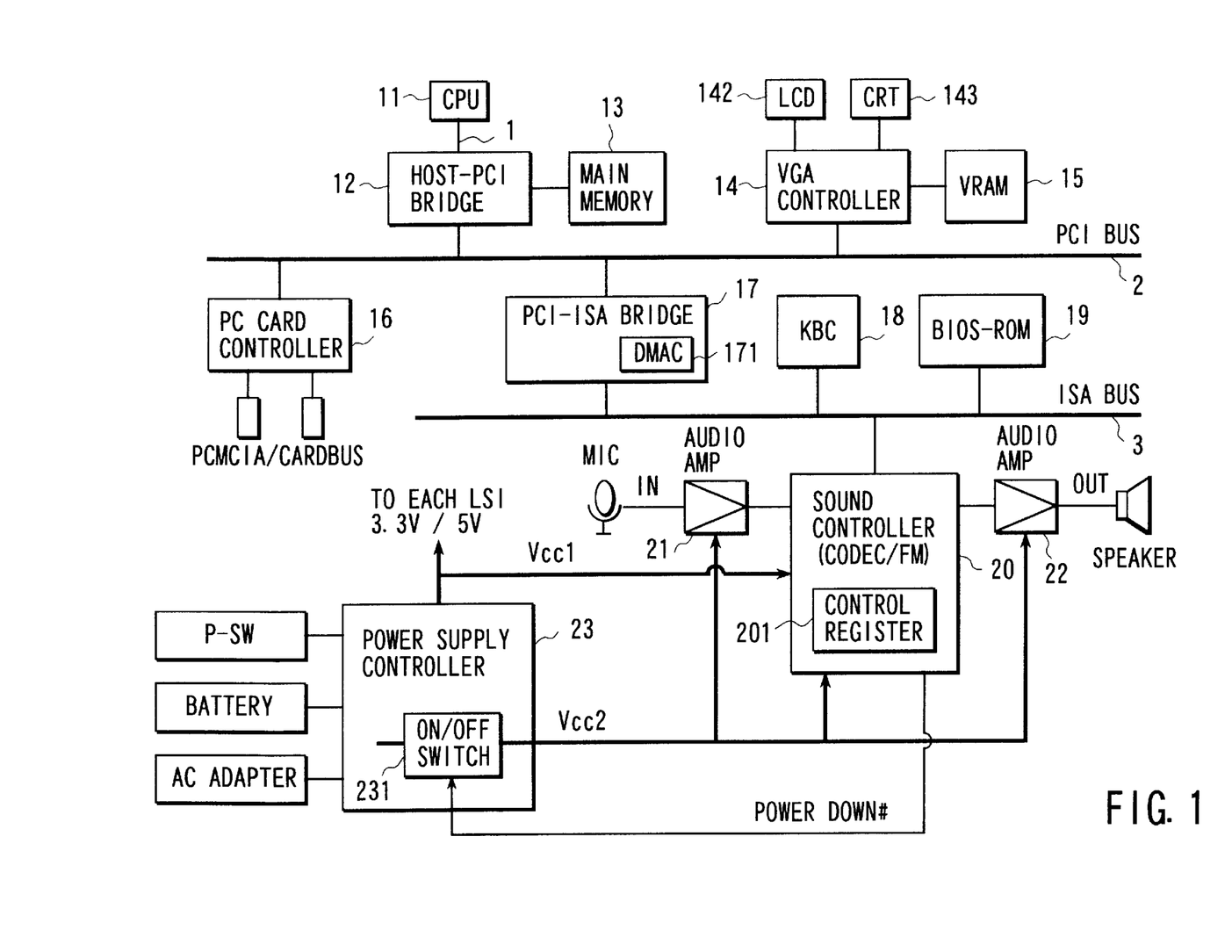
FIG. 1 is a block diagram showing the arrangement of the overall computer system according to an embodiment of the present invention.

FIG. 1 shows the arrangement of a computer system according to an embodiment of the present invention. This computer system is a notebook or laptop type portable personal computer, and on its system board, a processor bus 1, PCI bus 2, ISA bus 3, CPU 11, host-PCI bridge 12, main memory 13, VGA controller 14, video memory (VRAM) 15, PC card controller 16, PCI-ISA bridge 17, keyboard controller (KBC) 18, BIOS-ROM 19, sound controller 20, analog audio amplifiers 21 and 22, power supply controller 23, and the like are arranged.

The CPU 11 is implemented by, e.g., a microprocessor "Pentium" available from Intel Corp. U.S.A. The processor bus 1 directly connected to the I/O pins of the CPU 11 has a 64-bit wide data bus.

The main memory 13 is a memory device that stores an operating system, device drivers, application programs to be executed, processing data, and the like, and comprises a plurality of DRAMs. The main memory 13 is connected to the host-PCI bridge 12 via a dedicated memory bus having a 32- or 64-bit wide data bus. As the data bus of the memory bus, the data bus of the processor bus 1 may be used. In this case, the memory bus includes an address bus and various memory control signal lines.

The host-PCI bridge 12 is a bridge LSI that bridges between the processor bus 1 and PCI bus 2, and serves as one of bus masters of the PCI bus 2. The host-PCI bridge 12 has a function of converting a bus cycle including data and addresses two ways between the processor bus 1 and internal PCI bus 2, a function of controlling access to the main memory 13 via the memory bus, and the like.

The PCI bus 2 is a clocked I/O bus, and all the cycles on the PCI bus 2 are synchronized with PCI bus clocks. The frequency of the PCI bus clocks is a maximum of 33 MHz. The PCI bus 2 has an address/data bus which is used time-divisionally. The address/data bus has a 32-bit width.

The data transfer cycle on the PCI bus 2 consists of an address phase, and at least one data phase following the address phase. In the address phase, an address and transfer type are designated, and in the data phase, 8-, 16-, 24-, or 32-bit data is output.

The VGA controller 14 and PC card controller 16 respectively serve as bus masters of the PCI bus 2. The VGA controller 14 controls an LCD 142 and external CRT 143, and displays display data written in the VRAM 15 on these LCD 142 and external CRT 143. The PC card controller 16 controls PCMCIA or CARDBUS compatible PC cards.

The PCI-ISA bridge 17 is a bridge LSI that bridges between the PCI bus 2 and ISA bus 3. The PCI-ISA bridge 17 incorporates a DMA controller (DMAC) 171. The DMA controller (DMAC) 171 is used in, e.g, sound data transfer from the main memory 13 to the sound controller 20.

Figure 2:
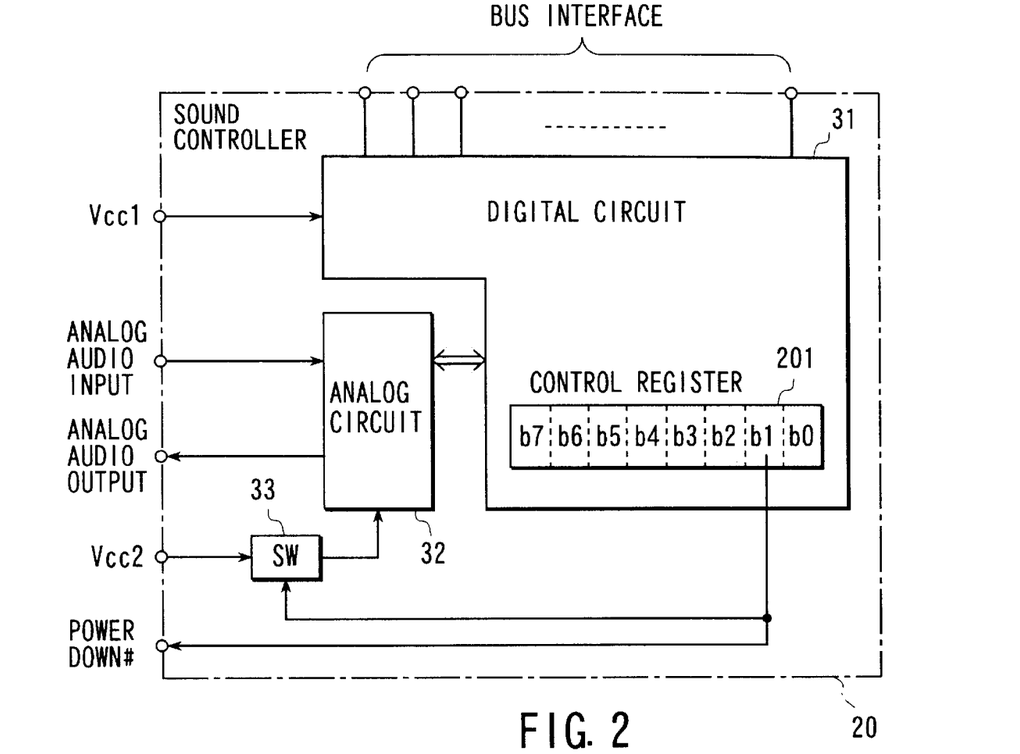
FIG. 2 is a block diagram showing the arrangement of a sound controller arranged in the computer system of the embodiment shown in FIG. 1.

The sound controller 20 controls, e.g., reproduction of sound data, and is used as a sound source of this system. The sound controller 20 incorporates a function as an FM sound source, and a CODEC for performing two-way conversion of digital and analog data. The sound controller 20 has a power down function. When a power down flag "0" is set at a predetermined bit position of a control register 201, the operation mode of the sound controller 20 is switched from a normal mode for normal operation to a power down mode with lower consumption power than in the normal mode. On the other hand, when the power down flag is reset to "1", the sound controller 20 is switched from the power down mode back to the normal mode. FIG. 2 shows the arrangement of the sound controller 20.

As shown in FIG. 2, the sound controller 20 is implemented by a single LSI, which incorporates a digital circuit portion 31 and analog circuit portion 32. The digital circuit portion 31 includes a logic unit for inputting/outputting sound data between the bus 3 and analog circuit portion 32, and the like, and is connected to a plurality of input/output signal pins for a bus interface. The digital circuit portion 31 operates using a power supply VCC1 input to a first power supply terminal as operation power. The analog circuit portion 32 performs, e.g., reproduction control of sound data, and is connected to analog audio I/O pins as an interface with the analog audio amplifiers 21 and 22. This analog circuit portion 32 operates using a power supply VCC2 input to a second power supply terminal as operation power.

A switch circuit 33 is inserted between the second power supply terminal and the analog circuit portion 32. When a power down flag "0" is set in bit 1 of the control register 201, the switch circuit 33 is turned off and stops supply of the power supply VCC2 to the analog circuit portion 32.

Bit 1 of the control register 201 is connected to one of output signal pins arranged on the chip of the sound controller 20. With this arrangement, the contents of the power down flag is output as a power down signal POWERDOWN# to external circuits. The power down signal POWERDOWN# is supplied to the power supply controller 23 shown in FIG. 1 to realize power savings of the audio amplifiers 21 and 22 as peripheral analog circuits of the sound controller 20.

The power supply controller 23 shown in FIG. 1 is a power supply device for supplying required operation power from a battery or AC adapter power supply to the individual LSIs in the system, and sets the system power ON or OFF in response to operation of a power switch (P-SW) by the user. The power supply controller 23 roughly has two systems of power supply outputs, i.e., power supply outputs (3V/5V/etc) for digital circuits, and a power supply output (5V) for analog circuits. Of the power supply outputs (3V/5V/etc) for digital circuits, a 5V power supply is supplied to the digital circuit portion in the sound controller 20 as the above-mentioned power supply VCC1. On the other hand, a 5V power supply for analog circuits is supplied to the analog circuit portion in the sound controller 20 as the above-mentioned power supply VCC2. The power supply VCC2 from the power supply controller 23 is also supplied to the analog audio amplifiers 21 and 22 as their operation power.

The power supply output VCC2 from the power supply controller 23 is ON/OFF-controlled by a switch circuit 231. More specifically, when the power down signal POWERDOWN# is "1", the switch circuit 231 is turned on and outputs the power supply VCC2. However, when the power down signal POWERDOWN# is "0", the circuit 231 is turned off and stops supply of the power supply output VCC2.

Figure 3:
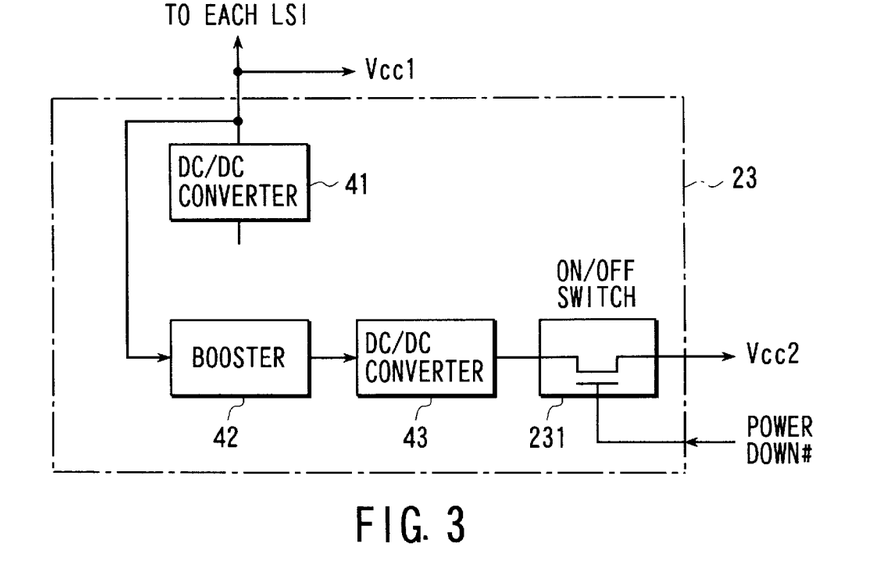
FIG. 3 is a block diagram showing the arrangement of a power supply controller arranged in the computer system of the embodiment shown in FIG. 1.

FIG. 3 shows the arrangement of the power supply controller 23. In FIG. 3, in addition to a DC/DC converter 41 for generating VCC1, a booster 42 and DC/DC converter 43 as circuits for generating VCC2 from VCC1 are arranged. The booster 42 and DC/DC converter 42 are used as a power supply voltage waveshaping circuit. The booster 42 temporarily boosts a 5V voltage VCC1 to about 6V. The DC/DC converter 43 re-converts the boosted voltage to 5V. With this arrangement, a stable analog power supply VCC2 can be generated. The output of the DC/DC converter 43 is connected to the switch circuit 231 comprising a transistor. This transistor is ON/OFF-controlled by the power down signal POWERDOWN#.

In the system shown in FIG. 1, the sound controller 20 has a signal pin for externally outputting the contents of bit 1 of the control register 201 for controlling its operation mode as the power down signal POWERDOWN# for controlling a power supply to the analog audio amplifiers 21 and 22. Using the power down signal POWERDOWN#, the analog audio amplifiers 21 and 22 can be ON/OFF-controlled in accordance with the operation state of the sound controller 20.

Figure 4:
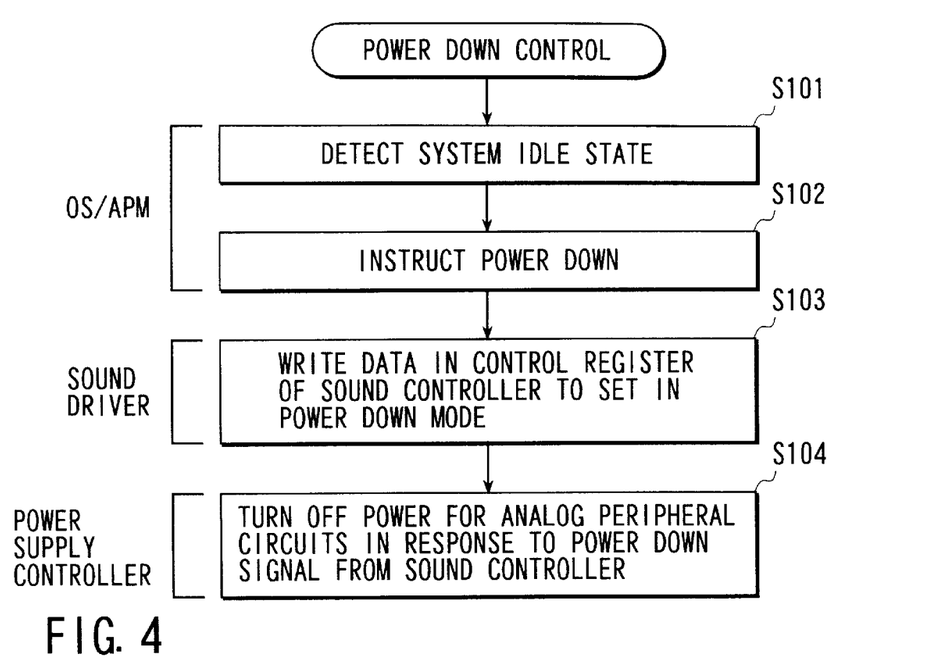
FIG. 4 is a flow chart showing the power down control sequence applied to the computer system of the embodiment shown in FIG. 1.
Figure 5:
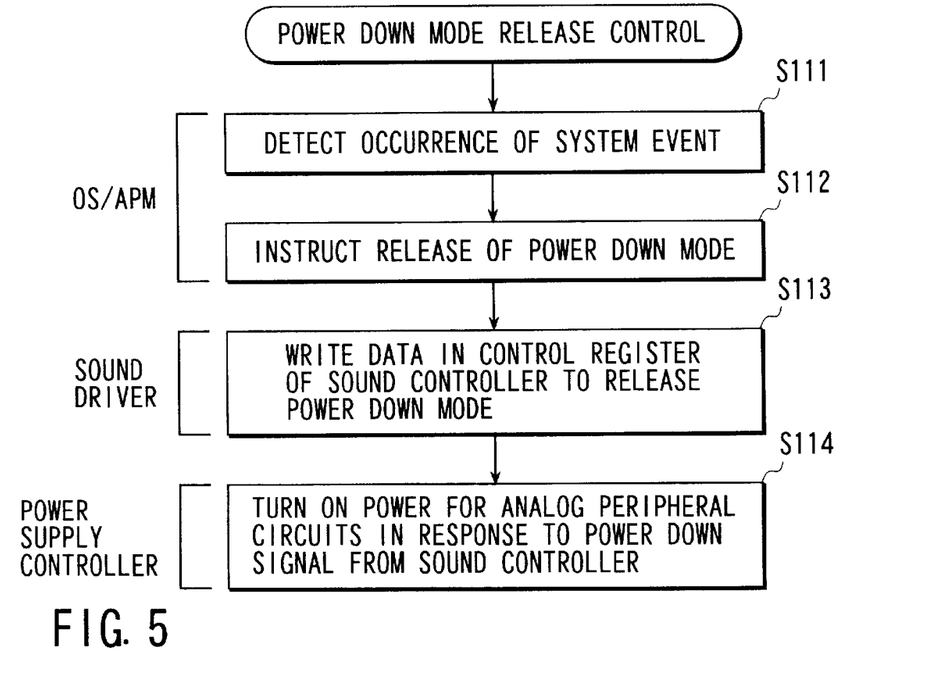
FIG. 5 is a flow chart showing the power down mode release sequence applied to the computer system of the embodiment shown in FIG. 1.

The power down control sequence of the sound controller 20 and analog audio amplifiers 21 and 22 will be explained below with reference to the flow charts in FIGS. 4 and 5.

Switching from the normal mode to the power down mode will be explained first with reference to FIG. 4.

When an ACPI function of the operating system or an APM driver for power management detects generation of a system idle state under the condition that no key input has been made by the user over a predetermined period of time, the bus cycle has halted over a predetermined period of time, or the like (step S101), the operating system or APM driver issues a power down instruction to a sound driver (step S102). The sound driver makes write access to the control register 201 of the sound controller 20 in response to the power down instruction, and sets a power down flag "0" in its bit 1 (step S103).

With this control, the switch circuit 33 of the sound controller 20 is turned off and stops supply of the power supply VCC2 to the analog circuit portion 32. As a result, the sound controller 20 is set in the power down mode. At the same time, the power down signal POWERDOWN# supplied from the sound controller 20 to the power supply controller 23 goes to active state "0". In response to the power down signal POWERDOWN#, the switch circuit 231 of the power supply controller 23 is turned off, thus stopping supply of the analog power supply VCC2 (step S104). Hence, the analog audio amplifiers 21 and 22 are set in the power down mode, i.e., operation halt state.

The power down mode release control will be explained below with reference to FIG. 5.

When the ACPI function of the operating system or the APM driver for power management detects generation of a system event (a key input from the user, generation of a bus cycle, or the like) (step S111), the operating system or APM driver issues a power down mode release instruction to the sound driver (step S112). In response to the power down mode release instruction, the sound driver makes write access to the control register 201 of the sound controller 20, and resets the power down flag in its bit 1 to "1" (step S113).

With this control, the switch circuit 33 of the sound controller 20 is turned on. At the same time, the power down signal POWERDOWN# supplied from the sound controller 20 to the power supply controller 23 goes to inactive state "1". In response to this power down signal POWERDOWN#, the switch circuit 231 of the power supply controller 23 is turned on, and restarts supply of the analog power supply VCC2 (step S114). As a consequence, the analog audio amplifiers 21 and 22 and the analog circuit portion 32 of the sound controller 20 receive electric power, and resume the normal mode for normal operation from the power down mode.

As described above, in this embodiment, since the power supply VCC2 common to the audio analog amplifiers 21 and 22, and the analog circuit portion 32 of the sound controller 20, is ON/OFF-controlled using the power down signal POWERDOWN#, even when the sound controller 20 itself has no power down function, power savings of the analog audio amplifiers 21 and 22, and the sound controller 20 can be realized.

Figure 6:
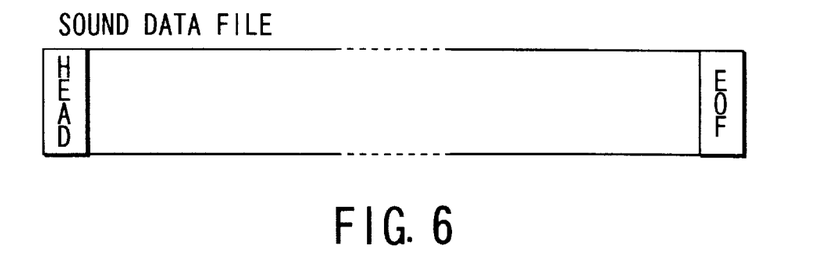
FIG. 6 shows an example of a sound data file used in the computer system of the embodiment shown in FIG. 1.
Figure 7:
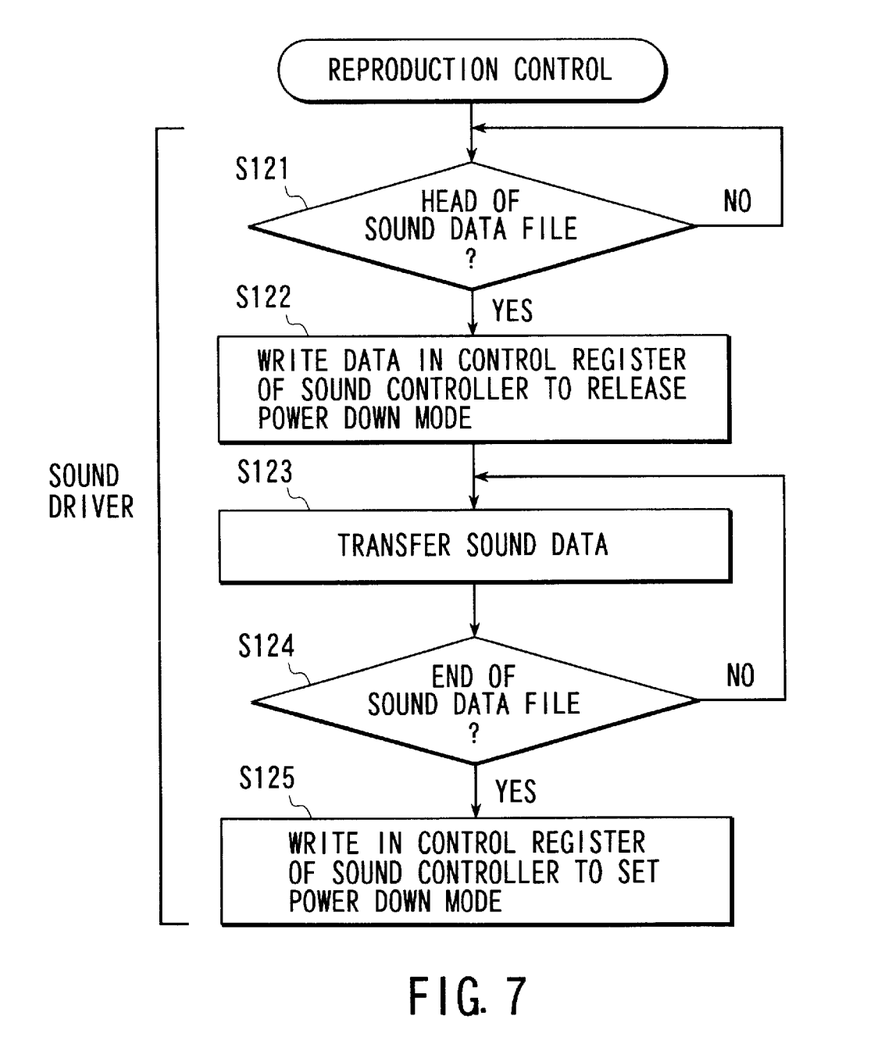
FIG. 7 is a flow chart showing the sound data reproduction control sequence applied to the computer system of the embodiment shown in FIG. 1.

The second power down control sequence used in this embodiment will be explained below with reference to FIGS. 6 through 8.

This second power down control dynamically switches the operation state of the sound controller 20 between the normal and power down modes in response to the start/end of reproduction of sound data by the sound controller 20. In order to realize such control, using header information (HEAD) and file end information (EOF) included in a sound data file shown in FIG. 6, the start and end positions of sound data to be transferred to and reproduced by the sound controller 20 are detected, and set/reset of the power down flag is controlled in accordance with the detection results.

More specifically, when sound data is reproduced, the sound driver maps the sound data to be reproduced on the main memory 13, and transfers it to the sound controller 20, thereby making the sound controller 20 reproduce the sound data. The sound driver resets the power down flag prior to transfer of the sound data, and sets the power down flag in response to the end of transfer of the sound data. FIG. 7 shows an example of this reproduction control sequence.

When the sound driver maps the start portion of the sound data file to be reproduced on the main memory 13, or detects that the sound data to be reproduced mapped on the main memory 13 includes its file start portion (step S121), it makes write access to the control register 201 of the sound controller 20 and resets the power down flag in its bit 1 to "1" (power down mode release) (step S122). Then, the analog audio amplifiers 21 and 22 and the analog circuit portion 32 of the sound controller 20 receive electric power, and resume the normal mode for normal operation from the power down mode.

After that, the sound driver repetitively executes data transfer from the main memory 13 to the sound controller 20 until it detects the end position of the sound data file to be transferred (steps S123 and S124).

Upon detection of the end of the sound data file, i.e., upon completion of file transfer, the sound driver makes write access to the control register 201 of the sound controller 20 and sets a power down flag "0" in its bit 1 (step S125). Therefore, the sound controller 20 and analog audio amplifiers 21 and 22 are set in the power down mode.

Figure 8:
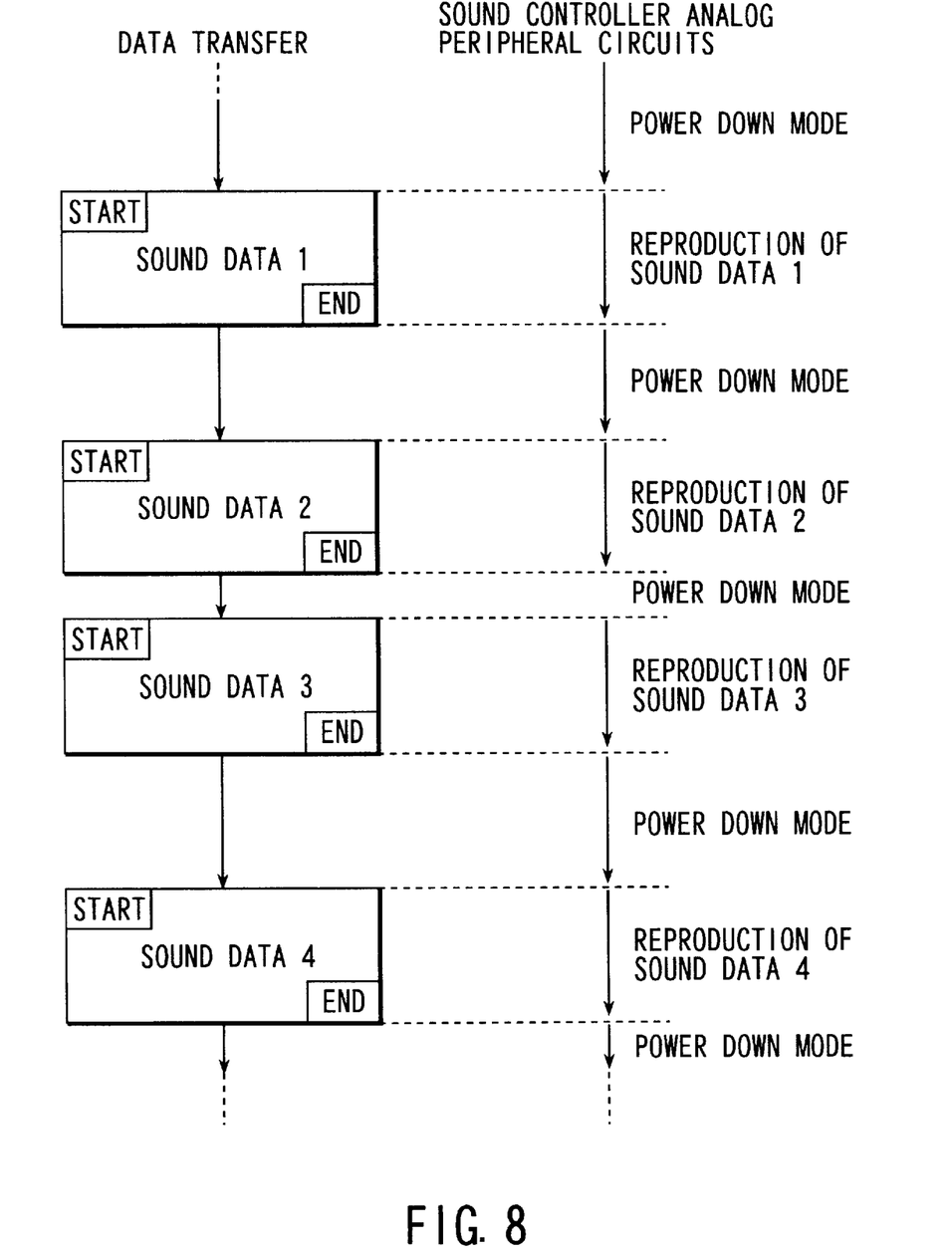
FIG. 8 is a chart showing dynamic switching of the operation modes in synchronism with the start/end of transfer of sound data when the sound data reproduction control shown in FIG. 7 is applied.

FIG. 8 shows the relationship between reproduction of sound data during system operation and switching of the operation modes of the sound controller 20 and analog audio amplifiers 21 and 22.

As can be seen from FIG. 8, since the power down mode is released prior to the beginning of transfer of each sound data, and is set at the end of transfer, the sound controller 20 and analog audio amplifiers 21 and 22 can be set in the power down mode during periods other than the reproduction period of sound data.

The second arrangement of the sound controller 20 will be explained below.

In the above embodiment, the operation modes of the sound controller 20 and analog audio amplifiers 21 and 22 are controlled by setting/resetting the power down mode flag in the control register 201. However, this arrangement uses an automatic operation mode switching function of automatically controlling generation of the signal POWERDOWN# by automatically detecting the start/end of transfer of sound data by a hardware logic in the sound controller 20.

The automatic operation mode switching function can be implemented by detecting the start and end of DMA transfer used for transferring sound data from the main memory 13 to the sound controller 20, and controlling generation of the power down signal POWERDOWN# accordingly.

The detailed arrangement of the automatic operation mode switching function built in the sound controller 20 will be explained below.

Figure 9:
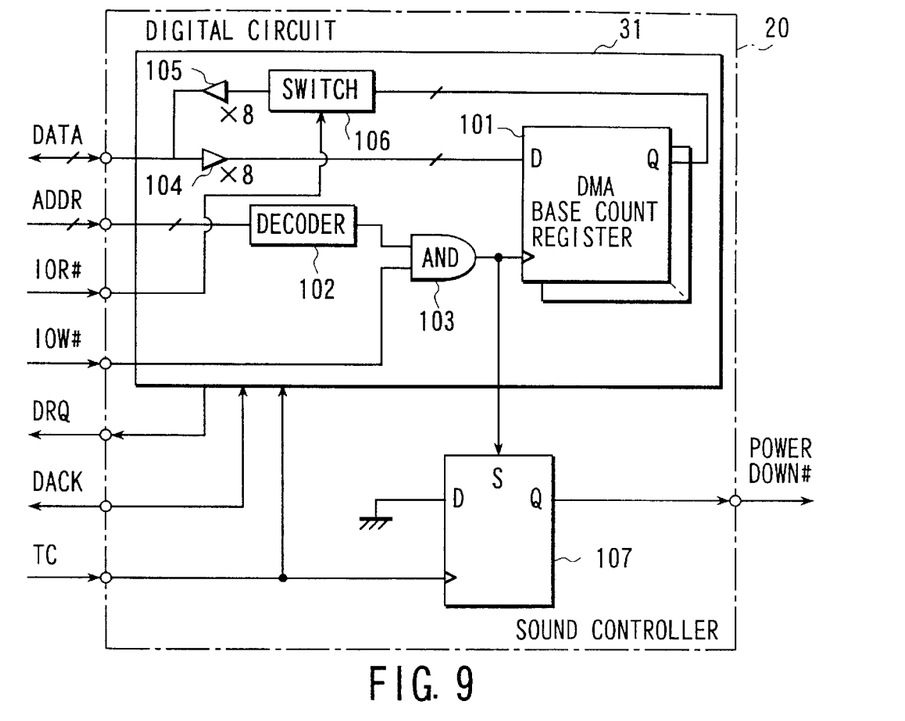
FIG. 9 is a circuit diagram showing an example of the arrangement of an automatic operation mode switching circuit applied to the sound controller arranged in the computer system of the embodiment shown in FIG. 1.
Figure 10A:
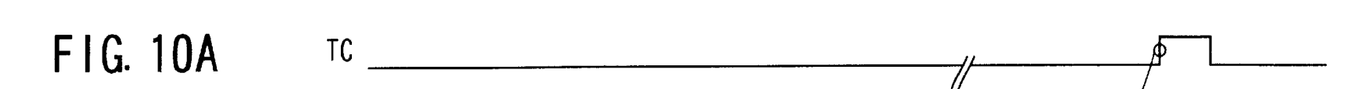
FIGS. 10A through 10H are timing charts for explaining the operation of the automatic operation mode switching circuit shown in FIG. 9.
Figure 10B:
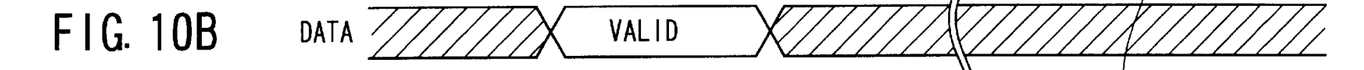
Figure 10C:
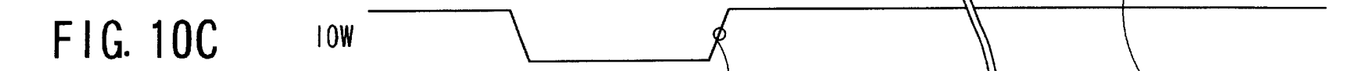
Figure 10D:
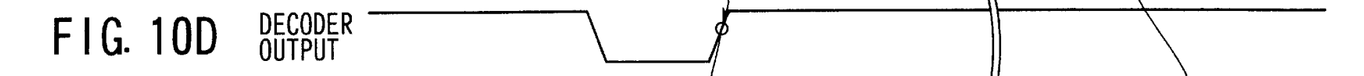
Figure 10E:
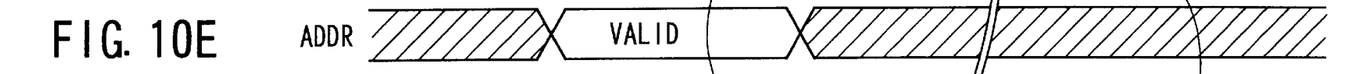
Figure 10F:
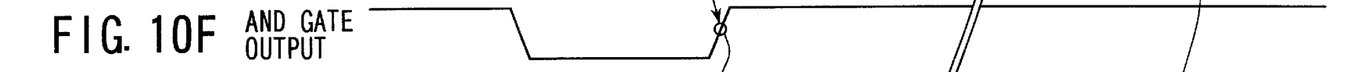
Figure 10G:
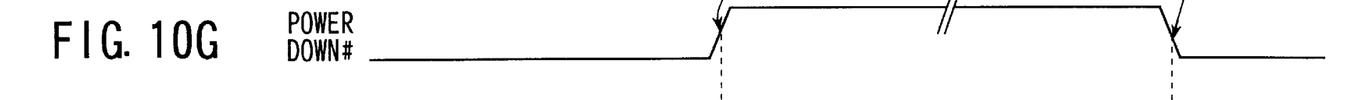
Figure 10H:
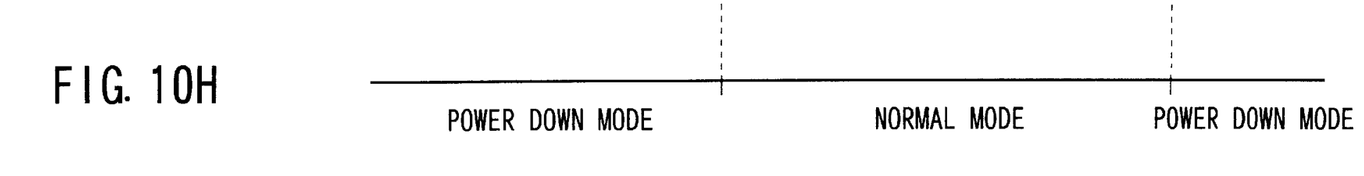

FIG. 9 shows the first arrangement of the sound controller 20 including the automatic operation mode switching function.

The digital circuit portion 31 of the sound controller 20 includes a DMA base count register 101, address decoder 102, AND gate 103, data transmission/reception buffers 104 and 105, and transmission/reception switch 106 as a hardware logic associated with DMA transfer, as shown in FIG. 9. Furthermore, in this arrangement, a D-flip-flop 107 is added as a circuit for controlling generation of the power down signal POWERDOWN#.

The DMA base count register 101 holds a copy of the contents of DMA channel setup information (the transfer count values indicating the transfer start address, transfer data length, and the like on the main memory 13), and comprises a plurality of D-flip-flops. When sound data is DMA-transferred from the main memory 13 to the sound controller 20, DMA channel setup information (the transfer count values indicating the transfer start address, transfer data length, and the like on the main memory 13) is set in the DMA controller 171. The DMA base count register 101 is used for backing up the contents of that DMA channel setup information. That is, after the DMA channel setup information is set in the DMA controller 171, the same contents as the DMA channel setup information are also written in the DMA base count register 101 by, e.g., the sound driver.

The D-flip-flop 107 is used for outputting the power down signal POWERDOWN# from one of signal output pins of the sound controller 20. The data input D of the D-flip-flop 107 is connected to ground, and its Q output is connected to a POWERDOWN# output pin. The clock input of the D-flip-flop 107 receives a DMA transfer completion signal TC from the DMA controller 171, and its set input S is connected to the output of the AND gate 103.

The POWERDOWN# generation control by the logic shown in FIG. 9 will be explained below with reference to the timing charts in FIGS. 10A through 10H.

When DMA channel setup information is written in the DMA base count register 101, the output from the AND gate 103, which receives an IO write signal IOW# and the output from the address decoder 102 rises from "L" to "H".

In synchronism with this leading edge, the Q output of the D-flip-flop 107 is reset to initial state "1" (power down mode release). Upon this operation, a power down signal POWERDOWN# in an inactive state, i.e., "1", is generated, and the sound controller 20 and analog audio amplifiers 21 and 22 are set in a non-power down mode.

After that, when the sound controller 20 has completed preparation for receiving transferred sound data, it issues a DMA request signal (DREQ) to the DMA controller 171, and DMA transfer of sound data from the main memory 13 to the sound controller 20 is started. Upon completion of transfer of all sound data, the DMA transfer completion signal TC sent from the DMA controller 171 to the sound controller 20 changes to "1".

In synchronism with this signal, the Q output of the D-flip-flop 107 is set at "0". Consequently, a power down signal POWERDOWN# in an active state, i.e., "0" is generated, and the sound controller 20 and analog audio amplifiers 21 and 22 are set in the power down mode.

The second arrangement of the sound controller 20 including the automatic operation mode switching function will be explained below with reference to FIG. 11.

Figure 11:
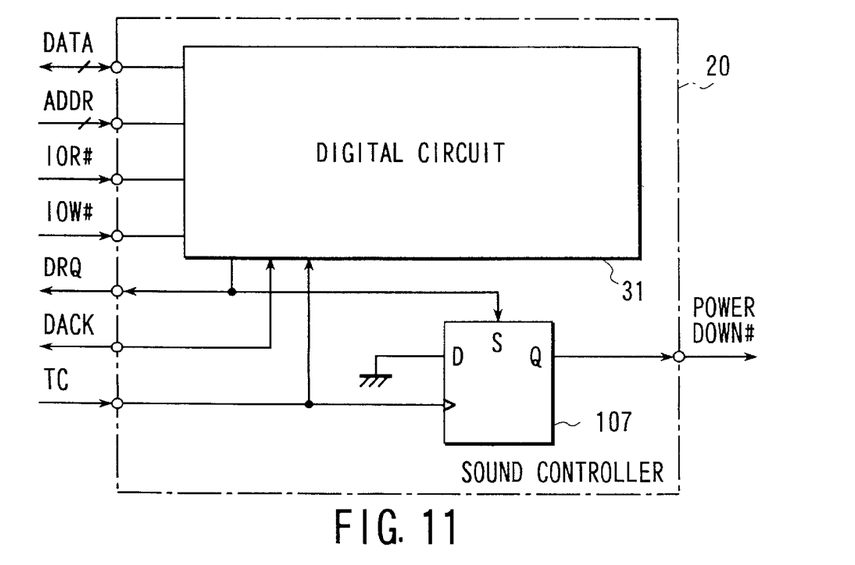
FIG. 11 is a circuit diagram showing another example of the arrangement of an automatic operation mode switching circuit applied to the sound controller arranged in the computer system of the embodiment shown in FIG. 1.

The arrangement shown in FIG. 11 is substantially the same as that in FIG. 9, except for connection of the set input terminal S of the D-flip-flop 107 for controlling generation of a power down signal POWERDOWN#.

More specifically, in this arrangement, the set input terminal S of the D-flip-flop 107 receives a DMA request signal (DMAQ). In this case, when the sound controller 20 issues a DMA request signal (DMAQ) to the DMA controller 171, the Q output of the D-flip-flop 107 is reset to initial state "1". In this way, a power down signal POWERDOWN# in an inactive state, i.e., "1" is generated, and the sound controller 20 and analog audio amplifiers 21 and 22 are set in the non-power down mode.

As described above, in the system of this embodiment, the sound controller 20 outputs a power down signal POWERDOWN#, and the analog audio circuits 21 and 22 are ON/OFF-controlled using the power down signal POWERDOWN#, thus realizing power down control of the analog audio circuits 21 and 22 in synchronism with switching of the operation modes of the sound controller 20.

By using the arrangement for detecting the start and end of transfer of sound data from the control information of a sound data file or using the start and end timings of DMA transfer, the operation state of the sound controller 20 can be dynamically switched between the non-power down mode and power down mode in synchronism with the start/end of reproduction of sound data by the sound controller 20.

Figure 12:
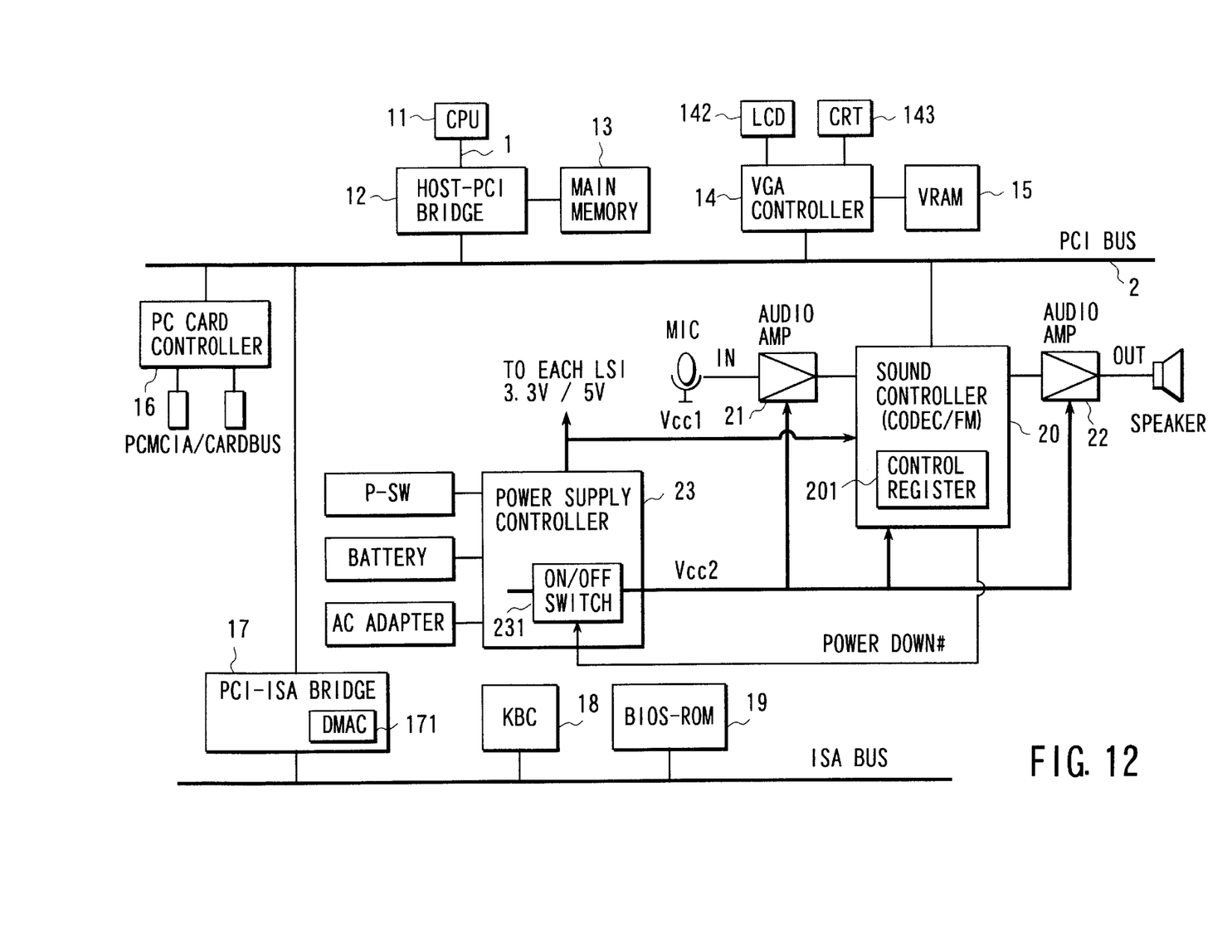
FIG. 12 is a block diagram of a system in which a sound controller is connected to a PCI bus according to the third embodiment of the present invention.

FIG. 12 is a block diagram showing a system according to the second embodiment of the present invention. In the embodiment shown in FIGS. 1 through 11, the sound controller 20 is connected to the ISA bus 3 but is connected to the PCI bus 2 in this embodiment. When the sound controller 20 is connected to the PCI bus 2, the sound controller 20 operates as a bus master. In other words, the sound controller 20 can detect the data fetch timing (event generation timing) by itself. Hence, when the sound controller 20 operates as a bus master, it can control the control register 201 to generate a power down signal POWERDOWN# of "1" (power down mode release); otherwise, it can control the control register 201 to generate a power down signal POWERDOWN# of "0" (power down mode set).

Figure 13:
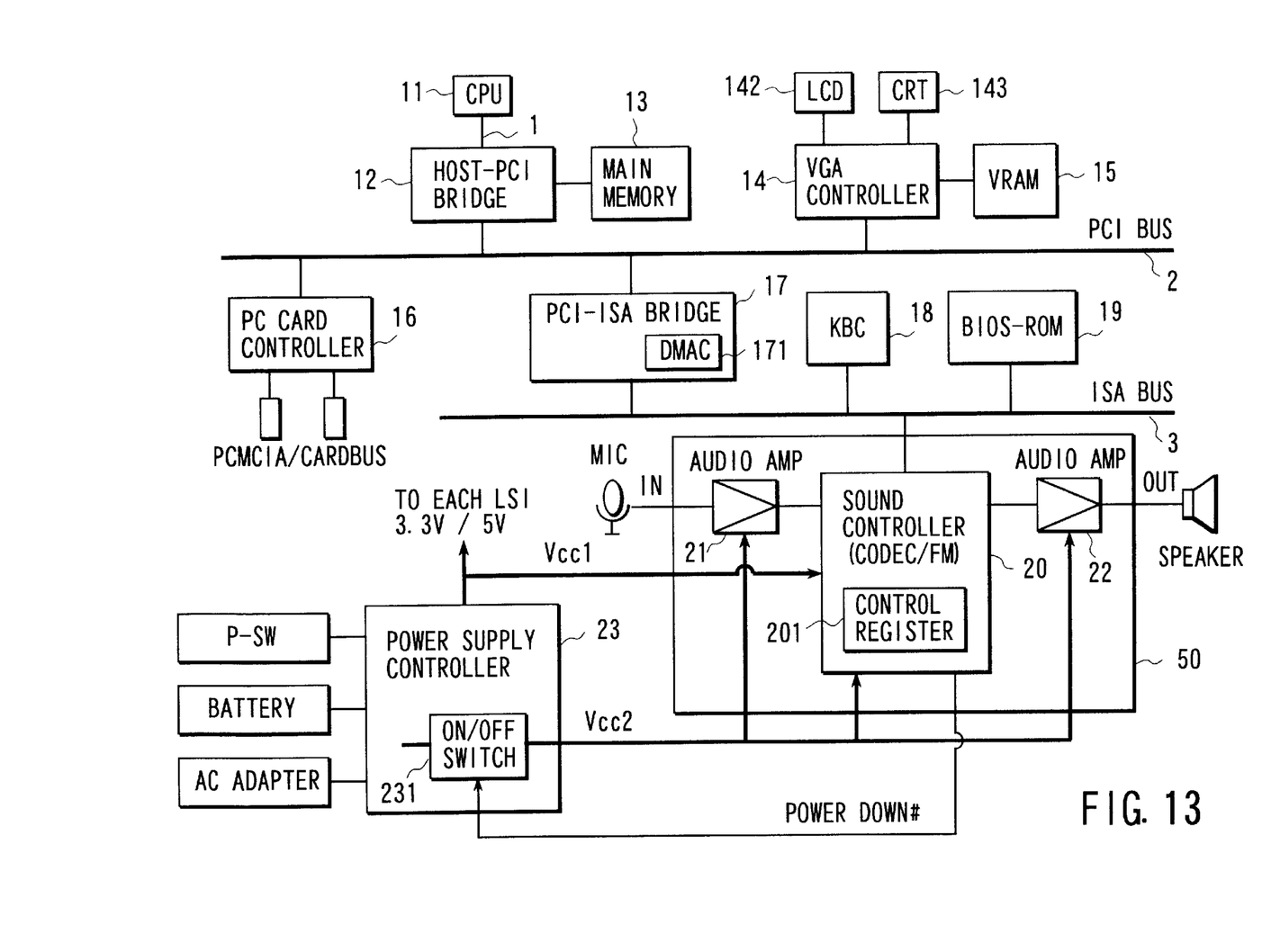
FIG. 13 is a block diagram of a system in which a sound controller and audio amplifiers are implemented by a single chip according to the third embodiment of the present invention.

FIG. 13 is a block diagram showing a system according to the third embodiment of the present invention. In this embodiment, the sound controller 20 and audio amplifiers 21 and 22 are realized by a single chip 50. Note that the one-chip sound controller 50 is connected to the ISA bus 3 in the embodiment shown in FIG. 13, but may be connected to the PCI bus 2.

Figure 14:
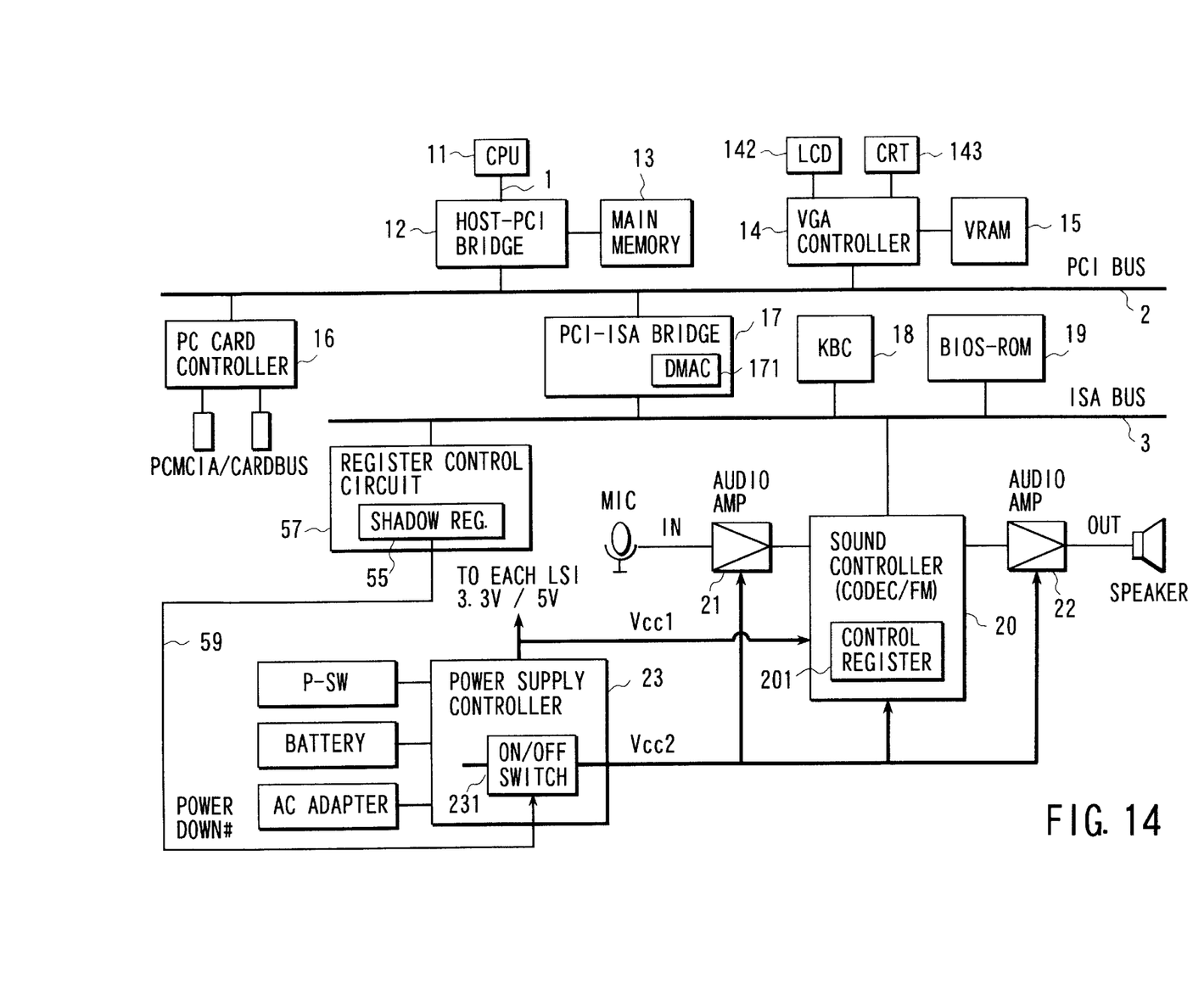
FIG. 14 is a block diagram of a system for controlling a power down signal using a shadow register according to the fourth embodiment of the present invention.

FIG. 14 is a block diagram showing a system according to the fourth embodiment of the present invention. In the above embodiments, the control register 201 in the sound controller 20 is controlled. However, in this embodiment, a register control circuit 57 including a shadow register 55 is connected to the ISA bus 3. The contents of the control register 201 ate copied to the shadow register 55. More specifically, control data for instructing to set or release the power down mode is written in the control register and in the shadow register 55 at the same time. In this case, only a write in the control register 201 in the sound controller 20 is granted, but its read is denied. On the other hand, both read and write of the shadow register 55 are granted. Hence, as shown in FIG. 14, a power down signal POWERDOWN# is supplied from the shadow register 55 to the switch circuit 231 via a line 59. With this arrangement, independently of the manufacturers and models of the sound controller, the present invention can be practiced without modifying the sound controller itself.

In the above description, the sound controller 20 has been explained as an ISA device, but the same power down control can be applied even if it is a PCI device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system comprising:

a sound controller for controlling reproduction of sound data, wherein said sound controller comprises sound reproduction means for converting sound data transferred from a memory of said computer system via DMA transfer to said sound controller into an audio signal, and means for externally outputting a second power down signal for setting an analog audio circuit serving as a peripheral circuit of said sound controller to receive an analog audio signal in a power down mode when a first power down signal is received;

a DMA controller having means for generating the first power down signal based on end timing of the DMA transfer for transferring the sound data and means for transferring sound data to be reproduced from the memory of said computer system to said sound controller using the DMA transfer; and a power supply circuit for supplying electric power to said analog audio circuit, said power supply circuit switching supply of the electric power to said analog audio circuit in accordance with the second power down signal output from said means for externally outputting, wherein said sound controller comprises a copy register in which a copy of a register value set in the DMA controller of said computer system for the purpose of the DMA transfer of the sound data is written, and said means for generating the second power down signal detects the end timing of the DMA transfer for transferring the sound data in response to a write of the copy of the register value in the DMA controller to said copy register, and a transfer completion signal from the DMA controller.

2. A system according to claim 1, wherein said means for generating the second power down signal comprises a flip-flop, and when the copy of the register value in the DMA controller is written in said copy register, a set terminal of said flip-flop is set and outputs an inactive power down signal, and a clock input terminal of said flip-flop receives the transfer completion signal from the DMA controller and outputs an active power down signal.

3. A system according to claim 1, wherein said means for generating the second power down signal comprises a flip-flop, a set terminal of said flip-flop receives the DMA request signal and outputs an inactive power down signal, and a clock input terminal of said flip-flop receives the transfer completion signal from the DMA controller and outputs an active power down signal.

* * * * *